United States Patent
Revelant et al.

(12)

(10) Patent No.: US 6,635,761 B1
(45) Date of Patent: Oct. 21, 2003

(54) CATALYST AND METHOD FOR TRIMERIZATION OF ISOCYANATES

(75) Inventors: Denis Revelant, Genas (FR); Jean-Marie Bernard, Mornant (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/530,607

(22) PCT Filed: Nov. 4, 1998

(86) PCT No.: PCT/FR98/02359

§ 371 (c)(1),
(2), (4) Date: Jun. 15, 2000

(87) PCT Pub. No.: WO99/23128

PCT Pub. Date: May 14, 1999

(30) Foreign Application Priority Data

Nov. 4, 1997 (FR) ............................................. 97 13856
Nov. 4, 1997 (FR) ............................................. 97 13855

(51) Int. Cl.⁷ ..................... C08G 18/02; C08G 18/18; C08G 18/20; C07D 295/20; C07D 233/54
(52) U.S. Cl. ..................... 544/222; 544/107; 544/193; 548/335; 548/358; 558/17
(58) Field of Search ........................... 558/17; 544/107, 544/193, 222; 548/358, 335

(56) References Cited

U.S. PATENT DOCUMENTS 3,980,594 A 9/1976 Fabris et al. ............... 260/77.5
4,040,992 A 8/1977 Bechara et al. ............. 544/180
5,405,886 A * 4/1995 Milliren et al. ............. 521/163
5,489,663 A 2/1996 Brandt et al. ................. 528/73

FOREIGN PATENT DOCUMENTS

| EP | 0 003 765 | 2/1979 |
| EP | 0 351 873 A | 7/1989 |
| EP | 0 443 167 A | 12/1990 |

OTHER PUBLICATIONS

Database WPI, Week 8233, Derwent Publications Ltd., London, GB; AN 82–69346e X0002060412 & JP 57 111310 A (Achilles Corp.), Jul. 10, 1982, see abstract.

* cited by examiner

Primary Examiner—John M. Ford
Assistant Examiner—Venkataraman Balasubramanian
(74) Attorney, Agent, or Firm—Burns, Doane, Swecker & Mathis, L.L.P.

(57) ABSTRACT

This invention relates to the use as catalyst for the cyclotrimerization reaction of isocyanates of a hydrogencarbonate of a cation which either as it is or in the form complexed with a complexing agent has an average molecular or ionic radius of more than 1 Å, preferably greater than 1.5 Å, and which is at least partially soluble in the reaction medium.

The invention also relates to a method of preparing (poly-)isocyanurate polyisocyanates by catalytic cyclotrimerization of isocyanates, in which a catalytic system is used which comprises a cyclotrimerization catalyst based on a quaternary ammonium salt as catalyst and imidazole as cocatalyst.

64 Claims, No Drawings

CATALYST AND METHOD FOR TRIMERIZATION OF ISOCYANATES

The invention relates to a catalyst used for the catalytic cyclotrimerization of monomeric isocyanates to (poly) isocyanurate polyisocyanates and to a method of preparing (poly)isocyanurate polyisocyanates by catalytic cyclotrimerization of monomeric isocyanates.

It is known to prepare isocyanate trimers by catalytic trimerization of an isocyanate using a catalyst based on a quaternary ammonium hydroxide.

Thus, EP-003 765 describes the partial cyclotrimerization of isophorone diisocyanate (IPDI or 1-isocyanato-3,3,5-trimethyl-5-isocyanatomethylcyclohexane) using a quaternary hydroxyalkylammonium hydroxide as catalyst.

Generally speaking, catalysts based on a quaternary ammonium hydroxide have a very high reactivity, which makes it difficult to control the trimerization reaction, especially when the initial isocyanate is an aliphatic or cycloaliphatic isocyanate.

In addition, control of the reaction is made still more difficult owing to the possible variations in the hydrolysable chlorine content of the initial isocyanate, which is a result of the phosgenation process used to synthesize these isocyanates.

It is also known that the effectiveness of the catalyst is reduced when the content of hydrolysable chlorine in the IPDI increases.

The content of hydrolysable chlorine also effects the coloration of the crude reaction product, which goes up as the amount of chlorine increases.

U.S. Pat. No. 4,040,992 describes, moreover, catalysts for the catalytic trimerization of isocyanates, the said catalysts being quaternary ammonium salts whose anion is represented by OH⁻ or by the formula $^-OOC-(O)_a-Y$ in which Y is selected from:

a hydrogen atom, an alkyl group having 1 to 20 carbon atoms, an alkenyl group having 2 to 15 carbon atoms, a cycloalkyl group having 3 to 6 carbon atoms, a phenyl group, an alkylphenyl group having 1 to 9 carbon atoms in the alkyl radical or in the groups attached to the phenyl ring, a benzyl group, a carbamate group, an alkylbenzyl group having 1 to 9 carbon atoms in the alkyl radical or in the groups attached to the benzyl ring, and a group $CH_{(3-b)}Z_{(b)}$ in which b is an integer from 1 to 3 and Z is OH, CN, Cl, an alkoxy group of 1 to 5 carbon atoms or a phenyl or methoxyphenyl group, or Z is $(CH_2)_d COOR$ in which d is an integer from 0 to 4 and R is a hydrogen atom or an alkyl group having up to 20 carbon atoms;

and a is zero or 1.

However, the anions illustrated in this patent are all anions derived from an alkylcarboxylic acid. Generally speaking, the catalysts described in this document do not allow the desired objective to be attained.

The objective of the invention is to provide a catalyst for cyclotrimerizing isocyanates, especially diisocyanates, which allows the reaction to be controlled while giving an acceptable degree of conversion, which should not substantially be dependent on the content of hydrolysable chlorine of the initial isocyanate, and which makes it possible to obtain a product whose coloration is not particularly marked.

The objective of the invention is also to provide a method of the catalytic trimerization of isocyanates, in particular for the partial cyclotrimerization of diisocyanates, which should be easy to control, which has little or no dependence on the content of hydrolysable chlorine in the monomeric isocyanate, and which as far as possible reduces the coloration of the crude reaction product.

It has now surprisingly been found that the catalysts of ionic type whose counteranion is the hydrogencarbonate anion allow the desired objective to be attained.

These catalysts are formed by a bulky monoatomic or polyatomic cation either as such or in the form of a complex formed with a complexing agent, in particular of the cryptand type.

The invention therefore relates to the use as catalyst for the cyclotrimerization reaction of isocyanates of a hydrogencarbonate of a cation which either as it is or in the form complexed with a complexing agent has an average molecular or ionic radius of more than 1 Å, preferably greater than 1.5 Å, as defined in the tables of Shannon and Prewitt in Acta Cris., 1969, vol. B25, page 925, and which is at least partially soluble in the reaction medium.

Advantageously, the cation is selected from the cations of bulky alkali metals, especially rubidium and caesium.

The cation may also consist of a light alkali metal cation in complexed form. Mention may be made in particular of sodium and potassium cations complexed by crown ethers.

The cation may likewise consist of a molecular species in which all of the atoms are linked by covalent bonds.

In this respect mention may be made of the onium-type cations, of which representative species are phosphoniums, sulphoniums and quaternary ammoniums.

Particular preference is given to the hydrogencarbonates of cations of the following formula I:

in which

Q is a nitrogen, phosphorus or sulphur atom; and $R_1$, $R_2$, $R_3$ and $R_4$ are identical or different and are unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, or aryl radicals having 6 to 15 carbon atoms which are unsubstituted or substituted by hydroxyl groups, or else, when Q is N, two of the radicals $R_1$, $R_2$, $R_3$ or $R_4$ may also form, together with the nitrogen atom and, if appropriate, with a heteroatom, especially oxygen or nitrogen, a heterocyclic ring having 4 to 6 carbon atoms, or else, when Q is N, the radicals $R_1$, $R_2$ and $R_3$ are each ethylene radicals which form, in combination with the quaternary nitrogen atom and another, tertiary nitrogen atom, a bicyclic triethylenediamine skeleton, or one of $R_1$ to $R_4$ is a group

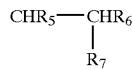

in which $R_5$, $R_6$ and $R_7$ are identical or different and are hydrogen, an OH group, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms, or a group $R_8$—O—$(CH_2)_n$ in which $R_8$ is hydrogen, an alkyl radical having 1 to 12 carbon atoms, a cycloalkyl radical having 4 to 10 carbon atoms, an aralkyl radical having 7 to 10 carbon atoms or an aryl radical having 6 to 10 carbon atoms; and n is an integer ranging from 1 to 6; $R_7$ can also be a group $OCOR_9$ in which $R_g$ is a $C_1$–$C_6$ alkyl group, preferably a $C_1$–$C_4$ alkyl group and, more particularly, the methyl group.

The cation is represented more particularly by the following general formula II:

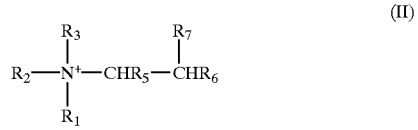

(II)

le;.5q$R_1$, $R_2$ and $R_3$ are identical or different radicals and are unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, or aryl radicals having 6 to 15 carbon atoms which are unsubstituted or substituted by hydroxyl groups, it also being possible for two of the radicals $R_1$, $R_2$ or $R_3$ to form, together with the nitrogen atom and, if appropriate, with an oxygen heteroatom or another nitrogen heteroatom, a heterocyclic ring having 4 to 6 carbon atoms, or else the radicals $R_1$, $R_2$ and $R_3$ are each ethylene radicals which form, in combination with the quaternary nitrogen atom and another, tertiary nitrogen atom, a bicyclic triethylenediamine skeleton, $R_5$, $R_6$ and R7 are identical or different and are hydrogen, an OH group, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms or a group $R_8$—O—$(CH_2)_n$ in which $R_8$ is hydrogen, an alkyl radical having 1 to 12 carbon atoms, a cycloalkyl radical having 4 to 10 carbon atoms, an aralkyl radical having 7 to 10 carbon atoms or an aryl radical having 6 to 10 carbon atoms; and n is an integer ranging from 1 to 6; it is also possible for $R_7$ to be a group $OCOR^9$ where $R_g$ is a $C_1$–$C_6$ alkyl group, preferably a $C_1$–$C_4$ alkyl group and, more particularly, the methyl group.

A preferred group of quaternary ammonium cations is made up of those compounds in which:

$R_1$, $R_2$ and $R_3$ are identical or different and are a linear $C_1$–$C_4$ alkyl group, preferably a $C_1$–$C_3$ alkyl group, more particularly a $C_1$–$C_2$ alkyl group, and preferably methyl, $R_5$ is H, OH, the methyl group or the hydroxymethyl group, $R_6$ is H, OH, the methyl group or the hydroxymethyl group, $R_7$ is H, OH, the methyl group, the hydroxymethyl group or the acetyl group.

Another preferred group of quaternary ammonium cations is made up of those compounds in which:

$R_1$, $R_2$ and $R_3$ are identical or different and a $C_1$–$C_4$ alkyl group, preferably a $C_1$–$C_3$ alkyl group, more particularly a $C_1$–$C_2$ alkyl group, and preferably methyl, $R_5$ is H or a $C_1$–$C_4$ alkyl group, $R_6$ is H, OH or a $C_1$–$C_4$ alkyl group, $R_7$ is H, OH, a $C_1$–$C_4$ alkyl group or the acetyl group where the total number of carbon atoms of $R_1$ to R7 does not exceed 8, preferably 6.

Still more advantageously, preference is given to those quaternary ammonium cations in which at least one, preferably two and, more preferably, the three groups $R_1$ to $R_3$ are the methyl group, $R_5$, $R_6$ and $R_7$ being as defined above, and preferably a single one of $R_5$ to $R_7$ being OH.

Another group of preferred quaternary ammonium cations is that in which $R_1$ to $R_3$ are a $C_1$–$C_4$ alkyl group or a $C_1$–$C_4$ hydroxyalkyl group and $R_5$ to $R_7$ are H or OH, the said compounds advantageously containing a single OH group in the omega position relative to the central nitrogen atom.

A more particularly preferred catalyst is choline hydrogencarbonate, especially when the isocyanate which it is desired to cyclotrimerize is a cycloaliphatic diisocyanate, such as NBDI, IPDI or $H_{12}$MDI, or a mixture of a cycloaliphatic diisocyanate as mentioned above and an aliphatic diisocyanate with a linear or branched chain, especially HDI.

Mention may also be made of tetramethylphosphonium or tetramethylsulphonium hydrogencarbonate and tetraphenylphosphonium or tetraphenylsulphonium hydrogencarbonate.

The catalysts according to the invention are known compounds.

They can be obtained, especially in the case of quaternary ammoniums, when $R_7$ is OH, by reacting a tertiary amine of general formula II:

(II)

in which $R_1$ to $R_3$ are as defined above with an epoxide of general formula III:

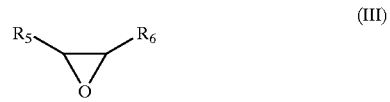

(III)

in which $R_4$ and $R_5$ are as defined above in the presence of $CO_2$ and $H_2O$.

In the case of esters, the hydroxylated quaternary ammonium can be esterified using, for example, an acylimidazole. In the case of ethers, an excess of epoxy is employed.

The catalyst according to the invention can be used for the cyclotrimerization of any type of isocyanate, or mixture of isocyanates, whether aliphatic, cycloaliphatic or aromatic, including prepolymers having terminal isocyanate groups, especially those described in U.S. Pat. No. 5,115,071, the content of which is incorporated by reference into the present application. It can therefore be used for the trimerization of isocyanates in the presence of various diols, triols and other polyols whose molecular weights are within a wide range, including polyols and aminopolyols containing polyether groups and polyester groups that are employed for the production of polyurethane resins and polyisocyanurates.

It is advantageously used for the cyclotrimerization of IPDI (isophorone diisocyanate, or 1-isocyanato-3,3,5-trimethyl-5-isocyanatomethylcyclo-hexane), NBDI (norbornane diisocyanate, or 2,5(6)-diisocyanatomethylbicyclo[2.2.1]heptane) and $H_{12}MDI$ (4,4'-dicyclohexylmethanediyl diisocyanate), alone or in a mixture with other diisocyanates, especially those having a linear aliphatic chain, such as HDI (hexamethylene diisocyanate).

Advantageously, the catalyst of the invention is added in an amount of between 300 and 5000 ppm, preferably between 500 and 3500 ppm, relative to the total amount of the initial isocyanates.

The catalyst is added to the reaction medium with stirring, preferably in the absence of solvent. The reaction is allowed to progress for a period of between 1 and 4 h, preferably about an hour and a half.

The reaction is advantageously conducted at a temperature between room temperature and 120 C, preferably between 40 and 100 C, advantageously under a neutral atmosphere.

The invention also relates to the use of the catalyst in a solid form as obtained, for example, by deposition of the catalyst on a mineral such as silica or by covalent fixing on a resin.

The invention also relates to a method of catalytic trimerization of isocyanates, especially diisocyanates, or of a mixture of isocyanates, especially a mixture of diisocyanates, characterized in that the trimerization catalyst used is a quaternary ammonium hydrogencarbonate as defined above.

It has also been found that the cyclotrimerization reaction can be substantially improved when imidazole or one of its derivatives is used as cocatalyst of a catalytic system based on a quaternary ammonium salt.

The invention therefore likewise relates to a method of preparing isocyanurate polyisocyanates by catalytic cyclotrimerization of isocyanates, in which a catalytic system is used which comprises a cyclotrimerization catalyst based on a quaternary ammonium salt as catalyst and imidazole or one of its derivatives as cocatalyst.

By imidazole derivatives are meant any compound comprising the imidazole ring and carrying one or more substituents which are customary in organic chemistry.

The imidazole derivatives correspond in particular to the general formula I:

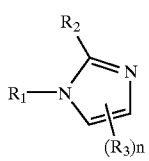

(I)

in which $R_1$, $R_2$ and $R_3$ are identical or different and are selected from H, OH, SH, a $C_1$–$C_4$ alkyl, $C_1$–$C_4$ hydroxyalkyl, $C_1$–$C_4$ aminoalkyl, $C_1$–$C_4$ alkylamino, dialkylamino (each alkyl group having 1 to 4 carbon atoms), $C_1$–$C_4$ alkylthio, $C_1$–$C_4$ haloalkyl, $C_3$–$C_8$ cycloalkyl, $C_5$–$C_{10}$ aryl, ($C_5$–$C_{10}$ aryl)-$C_1$–$C_4$ alkyl or ($C_1$–$C_4$ alkyl)-$C_5$–$C_{10}$ aryl group, a heterocyclic group where the heterocycle comprises 2 to 10 carbon atoms and 1 to 4 identical or different heteroatoms selected from O, S and N and the group $NR_4$ in which $R_4$ is, in particular, $C_1$–$C_4$ alkyl or $C_3$–$C_8$ cycloalkyl, and n is 0, 1 or 2.

Advantageously, the catalyst based on a quaternary ammonium salt is as defined above.

However, it is possible to use any known type of cyclotrimerization catalyst of the quaternary ammonium salt type.

Mention may be made in particular of the salts of compounds of the following general formula:

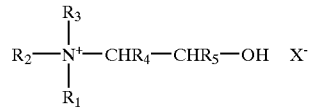

in which $R_1$, $R_2$ and $R_3$ are identical or different radicals and are unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, or aryl radicals having 6 to 15 carbon atoms which are unsubstituted or substituted by hydroxyl groups, it also being possible for two of the radicals $R_1$, $R_2$ or $R_3$ to form, together with the nitrogen atom and, if appropriate, with an oxygen heteroatom or another nitrogen heteroatom, a heterocyclic ring having 4 to 6 carbon atoms, or else the radicals $R_1$, $R_2$ and $R_3$ are each ethylene radicals which form, in combination with the quaternary nitrogen atom and another, tertiary nitrogen atom, a bicyclic triethylenediamine skeleton, $R_4$ and $R_5$ are identical or different and are hydrogen and/or an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms or a group $R_6$—O—$(CH_2)_n$ in which $R_6$ is hydrogen, an alkyl radical having 1 to 12 carbon atoms, a cycloalkyl radical having 4 to 10 carbon atoms, an aralkyl radical having 7 to 10 carbon atoms or an aryl radical having 6 to 10 carbon atoms; and n is an integer having a value from 1 to 6; and $X^-$ is an anion advantageously selected from $OH^-$ and the anions of formula $^-OOC$—$(O)_a$—Y in which Y is selected from a hydrogen atom, an alkyl group having 1 to 20 carbon atoms, an alkenyl group having 2 to 15 carbon atoms, a cycloalkyl group having 3 to 6 carbon atoms, a phenyl group, an alkylphenyl group having 1 to 9 carbon atoms in the alkyl radical or in the groups attached to the phenyl ring, a benzyl group, a carbamate group, an alkylbenzyl group having 1 to 9 carbon atoms in the alkyl radical or in the groups attached to the benzyl ring, and a group $CH_{(3-b)}Z_{(b)}$ in which b is an integer from 1 to 3 and Z is OH, CN, Cl, an alkoxy group of 1 to 5 carbon atoms or a phenyl or methoxyphenyl group, or Z is $(CH_2)_d COOR$ in which d is an integer from 0 to 4 and R is a hydrogen atom or an alkyl group having up to 20 carbon atoms;

and a is zero or 1.

X is preferably carboxylate anions and the anion $HCO_3^-$.

The compounds of the above general formula are described in EP 3765 and U.S. Pat. No. 4,040,992, the content of which is incorporated by reference into the present application.

When the isocyanate which it is desired to cyclotrimerize is a cycloaliphatic diisocyanate, such as NBDI, IPDI or $H_{12}$MDI, or a mixture of a cycloaliphatic diisocyanate and an aliphatic diisocyanate having a linear chain, especially HDI, it is preferred to use as catalyst a quaternary ammonium hydrogencarbonate as defined above, especially choline hydrogencarbonate.

The use of a catalytic system comprising a quaternary ammonium salt and imidazole or its derivatives, in accordance with the present invention, makes it possible to obtain an increase in the reactivity of the isocyanates, especially cycloaliphatic isocyanates, if appropriate in a mixture with aliphatic isocyanates having a linear chain, the said reactivity being able to be controlled in an effective manner substantially independent of the content of hydrolysable chlorine of the starting monomeric isocyanate(s).

In addition, the reaction mixture obtained at the end of the cyclotrimerization reaction, which may if appropriate be partial, has a level of coloration which is sharply reduced relative to that of a reaction mixture obtained in the absence of imidazole.

Moreover, the use of imidazole as cocatalyst of a cyclotrimerization reaction in which the catalyst is a quaternary ammonium salt results in the formation of a substantial quantity of uretdione-ring dimers of the initial isocyanate(s), which is suitable for improving the properties of the resulting mixture and, in particular, for reducing the viscosity of isocyanurate polyisocyanates.

Advantageously, imidazole is added with stirring to the isocyanate monomer(s) which it is desired to polymerize, preferably in the absence of solvent, and stirring is continued until a homogeneous mixture is obtained.

The catalyst is added while continuing stirring and while heating the reaction medium.

The reaction is allowed to proceed for a duration of between 1 and 4 h, preferably for about an hour and a half.

The use of imidazole as cocatalyst also makes it possible to reduce substantially the amount of catalyst required for the cyclotrimerization of the isocyanate(s).

It is sufficient, for example, to employ an amount of catalyst ranging from 100 to 300 ppm, preferably about 200 ppm, relative to the amount of initial isocyanate(s) when the amount of cocatalyst is from 400 to 800 ppm, preferably about 600 ppm, relative to the amount of initial isocyanate (s).

The cyclotrimerization reaction, in particular a partial cyclotrimerization reaction, is conducted at a temperature between room temperature and 120 C, advantageously from 60 to 70 C in the case of IPDI.

The invention also relates to a (poly)isocyanurate polyisocyanate composition obtained by the process according to the invention and comprising, in particular, the following compounds:

the trimer of NBDI, the trimer of $H_{12}$MDI, the trimer of IPDI, the mixed NBDI/HDI, IPDI/HDI or $H_{12}$MDI/HDI trimers, where the proportion of HDI can vary from 5 to 95% by weight.

The invention also relates to a (poly)isocyanurate polyisocyanate composition obtained by the process according to the invention, such a composition being characterized by the presence of products of reaction of initial isocyanate with the imidazole and of the polymerization products of these isocyanates, especially in the form of isocyanurates, with imidazole or one of its derivatives, it also being possible for these products to include biuret groups, carbamate groups and/or allophanate groups obtained by reaction of the isocyanate groups with the OH groups present in the catalyst.

The products obtained may subsequently undergo a chemical reaction: dimerization, allophanatization, biuretization, blocking reaction with a blocking (or masking) agent, either before or after distillation of the monomer.

The compounds obtained are used for the preparation of coatings, especially as base constituents for varnishes and paints.

The examples which follow illustrate the invention.

EXAMPLE 1

Preparation of Isophorone Diisocyanate Trimer (IPDT).

A 1 l reactor is charged with 800 g of IPDI. The initial charge is stirred under a stream of argon and the temperature is raised to 85 C.

When the temperature has stabilized, 0.56 g (0.07% by weight) of choline bicarbonate is added. The reaction is allowed to continue for 3 hours, following the progression of the degree of conversion of IPDI by potentiometric measurement of the amount of NCO.

80 g of IPDT are obtained, corresponding to a degree of conversion of 10%.

EXAMPLE 2

Preparation of Isophorone Diisocyanate Trimer (IPDT)

The procedure of Example 1 is repeated but 1.6 g (0.2% by weight) of choline bicarbonate is added and the reaction mixture is heated to 60 C.

320 g of IPDT are obtained, corresponding to a degree of conversion of IPDI of 40%.

EXAMPLES 3 to 5

Comparative Examples

In addition, the reactivity of choline hydrogencarbonate was compared with that of choline hydroxide, choline bisulphite and choline bitartrate.

The results of Examples 1 to 5 are reported in the table below.

| Examples | Catalyst | [cata]* % by weight | Reaction temperature (C) | DC IPDI (%) |
|---|---|---|---|---|
| 1 | Choline bicarbonate | 0.07 | 85 | 10 |
| 2 | Choline bicarbonate | 0.2 | 60 | 40 |
| 3 | Choline hydroxide | 0.07 | 85 | 40 |
| 4 | Choline bisulphite | 0.07 | 85 | 0 |
| 5 | Choline bitartrate | 0.2 | 80 | 0 |

*The [cata] figures are calculated on the basis of 100% choline salts.

It is apparent that, of the various choline salts, only the bicarbonate has a catalytic activity which is lower and more easy to control, namely an activity which is 2.8 times less than that of choline hydroxide.

EXAMPLE 6

Preparation of IPDT

IPDI (800 g) is charged to a 1 l reactor and is stirred under a stream of argon.

Imidazole is introduced in an amount of 4 mmol/100 g of IPDI at room temperature. Stirring is continued and the reaction medium is brought to 80 C. When the temperature is stabilized, choline bicarbonate is introduced (0.05% by weight). The progress of the reaction is monitored by measuring the degree of conversion (DC) of the IPDI over time by potentiometric measurement of the amount of NCO.

The reaction is continued for a period of an hour and a half. The resulting degree of conversion of the IPDI is about 70%.

EXAMPLE 7

Preparation of IPDT

The procedure of Example 6 is repeated but the amount of catalyst introduced is 0.028% by weight.

The reaction is continued at 80 C for a period of two hours. The degree of conversion of the IPDI is 60%.

EXAMPLES 8 and 9

Comparative Example

The procedure of Example 6 is repeated but without the introduction of imidazole. The amounts of catalyst (choline hydrogencarbonate) are 0.2% and 0.15% by weight.

The coloration of the reaction medium is evaluated in accordance with the method AFNOR NF T20605 or ASTM D1209.84.

In order to promote reactivity and to limit the development of coloration, the IPDI is redistilled prior to the trimerization reaction.

The results are reported in the table below.

| Ex. | Catalyst | Cocatalyst | [cata] % by weight | [cocata] mmol/100 g | Reaction temperature in C. | DC of IPDI in % | APHA colour no. |
|---|---|---|---|---|---|---|---|
| 6 | Choline bicarbonate | Imidazole | 0.05 | 4 | 80 | 70 | 70 |
| 7 | Choline bicarbonate | Imidazole | 0.028 | 4 | 80 | 60 | 60 |
| 8 | Choline bicarbonate | None | 0.2 | 0 | 80 | 50 | 140 |
| 9 | Choline bicarbonate | None | 0.15 | 0 | 80 | 32 | 140 |

The fact of redistilling the IPDI does not improve the coloration level of the crude synthesis product (140 APHA). On the other hand, the conversion kinetics are markedly more rapid. A 25% reduction in the catalyst content (Example 9) limits the degree of conversion of the IPDI but does not affect the coloration.

The addition of imidazole, surprisingly, accelerates greatly the trimerization kinetics even with a catalyst content which is eight times smaller (Example 7) while reducing the coloration of the crude synthesis product by half (60–70 APHA). Moreover, the formation of IPDI trimer is accompanied by the co-production of dimer.

The trimerization kinetics are shown in the attached figure.

The effect of imidazole on the initial rate of conversion is spectacular, with the required reaction times being halved (slower end of reaction). It is not necessary to deactivate the catalyst, which would suggest in situ decomposition.

What is claimed is:

1. A method for preparing polyisocyanurate polyisocyanates by catalytic cyclotrimerization of monomeric isocyanates comprising:

adding to a reaction medium comprising the monomeric isocyanates a catalyst comprising a hydrogencarbonate of a cation which either as such or in the form complexed with a complexing agent has an average molecular or ionic radius of more than 1 Å, and which is at least partially soluble in the reaction medium;

allowing the reaction to progress for a period between 1 and 4 hours at a temperature between room temperature and 120° C.; and isolating the product obtained thereby.

2. The method of claim 1, wherein said cation has an average molecular or ionic radius greater than 1.5 Å.

3. A method for preparing polyisocyanurate polyisocyanates by catalytic cyclotrimerization of monomeric isocyanates comprising:

adding to a reaction medium comprising the monomeric isocyanates a catalyst comprising a hydrogencarbonate of a cation of formula I:

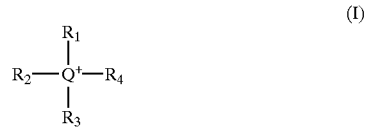

in which

Q is selected from the group consisting of a nitrogen, phosphorus and sulphur atom; and $R_1$, $R_2$, $R_3$ and $R_4$ are identical or different and are selected from the group consisting of unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, and aryl radicals having 6 to 15 carbon atoms which are unsubstituted or substituted by hydroxyl groups, or, when Q is N, two of the radicals $R_1$, $R_2$, $R_3$ or $R_4$ optionally form together with the nitrogen atom and, optionally, with a heteroatom, selected from oxygen and nitrogen, a heterocyclic ring having 4 to 6 carbon atoms, or, when Q is N, the radicals $R_1$, $R_2$ and $R_3$ are each ethylene radicals which form, in combination with the quaternary nitrogen atom and another tertiary nitrogen atom, a bicyclic triethylenediamine, or one of $R_1$ to $R_4$ is a group

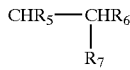

in which $R_5$, $R_6$ and $R_7$ are identical or different and are selected from the group consisting of hydrogen, an OH group, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms, and a group of formula $R_8$—O—$(CH_2)_n$, in which $R_8$ is selected from the group consisting of hydrogen, an alkyl radical having 1 to 12 carbon atoms, a cycloalkyl radical having 4 to 10 carbon atoms, an aralkyl radical having 7 to 10 carbon atoms and an aryl radical having 6 to 10 carbon atoms, and n is an integer ranging from 1 to 6;

or $R_7$ is optionally a group of formula $OCOR_9$ in which $R_9$ is a $C_1$–$C_6$ alkyl group;

allowing the reaction to progress for a period between 1 and 4 hours at a temperature between room temperature and 120° C.; and isolating the product obtained thereby.

4. The method of claim 3, wherein the cation has the following formula II:

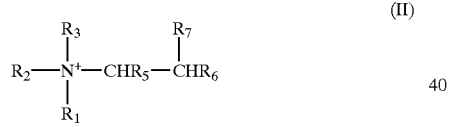

in which $R_1$, $R_2$ and $R_3$ are identical or different radicals and are selected from the group consisting of unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, and aryl radicals having 6 to 15 carbon atoms which are unsubstituted or substituted by hydroxyl groups, or two of the radicals selected from $R_1$, $R_2$ and $R_3$ form, together with the nitrogen atom and, optionally, with an oxygen heteroatom or another nitrogen heteroatom, a heterocyclic ring having 4 to 6 carbon atoms, or the radicals $R_1$, $R_2$ and $R_3$ are each ethylene radicals which form, in combination with the quaternary nitrogen atom and another tertiary nitrogen atom, a bicyclic triethylenediamine, $R_5$, $R_6$ and $R_7$ are identical or different and are selected from the group consisting of hydrogen, an OH group, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms and a group of formula $R_8$—O—$(CH_2)_n$ in which $R_8$ is hydrogen, an alkyl radical having 1 to 12 carbon atoms, a cycloalkyl radical having 4 to 10 carbon atoms, an aralkyl radical having 7 to 10 carbon atoms and an aryl radical having 6 to 10 carbon atoms;

n is an integer ranging from 1 to 6;

and $R_7$ is optionally a group of formula $OCOR_9$ where $R_9$ is a $C_1$–$C_6$ alkyl group.

5. The method of claim 3, wherein:

$R_1$, $R_2$ and $R_3$ are identical or different and are selected from the group consisting of a linear $C_1$–$C_4$ alkyl group, $R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

6. The method of claim 3, wherein $R_1$, $R_2$ and $R_3$ identical or different represent a $C_1$–$C_3$ group;

$R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

7. The method of claim 3, wherein $R_1$, $R_2$ and $R_3$ identical or different represent a $C_1$–$C_2$ group;

$R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

8. The method of claim 3, wherein $R_1$, $R_2$ and $R_3$ identical or different represent a methyl group;

$R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

9. The method of claim 3, wherein:

$R_1$, $R_2$ and $R_3$ identical or different represent a $C_1$–$C_4$ alkyl group, $R_5$ is H or a $C_1$–$C_4$ alkyl group, $R_6$ is H, OH or a $C_1$–$C_4$ alkyl group, $R_7$ is H, OH, a $C_1$–$C_4$ alkyl group or an acetyl group where the total number of carbon atoms of $R_1$ to $R_7$ does not exceed 8.

10. The method of claim 3, wherein at least one of groups $R_1$ to $R_3$ is a methyl group.

11. The method of claim 3, wherein at least one of groups $R_1$ to $R_3$ is a methyl group, and one of $R_5$ to $R_7$ is OH.

12. The method of claim 1, wherein at least two of the groups $R_1$ to $R_5$ are methyl.

13. The method of claim 1, wherein at least two of the groups $R_1$, $R_2$ and $R_3$ are methyl.

14. The method of claim 3, wherein $R_1$ to $R_3$ are a $C_1$–$C_4$ alkyl group or a $C_1$–$C_4$ hydroxyalkyl group and $R_5$ to $R_7$ are H or OH.

15. The method of claim 1, wherein the compound is choline hydrogencarbonate.

16. The method of claim 1, wherein the amount of catalyst is from 300 to 5000 ppm relative to the monomeric isocyanate or to the mixture of monomeric isocyanates.

17. The method of claim 1, wherein the catalyst is in a solid form obtained by depositing the hydrogen carbonate compound on a solid or by covalent fixing on a support.

18. A method of preparing (poly)isocyanurate polyisocyanates by catalytic cyclotrimerization of isocyanates comprising:

adding to a reaction medium comprising said isocyanates a catalytic system which comprises a cyclotrimerization catalyst based on a quaternary ammonium salt as catalyst and imidazole or one of its derivatives as cocatalyst, allowing the reaction to progress for a period between 1 and 4 hours at a temperature between room temperature and 120° C.; and isolating the product obtained thereby.

19. The method of claim 18, wherein the cyclotrimerization catalyst is a hydrogencarbonate of a cation which either as such or in the form complexed with a complexing agent has an average molecular or ionic radius of more than 1 Å.

20. The method of claim 18, wherein the catalyst is a quaternary ammonium salt of formula:

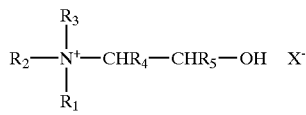

in which $R_1$, $R_2$ and $R_3$ being either identical or different are selected from the group consisting of unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, and aryl radicals having 6 to 15 carbon atoms which are unsubstituted or substituted by hydroxyl groups, or two of the radicals $R_1$, $R_2$ or $R_3$ optionally form together with the nitrogen atom and, optionally, with an oxygen heteroatom or another nitrogen heteroatom, a heterocyclic ring having 4 to 6 carbon atoms, or the radicals $R_1$, $R_2$ and $R_3$ are each ethylene radicals which form, in combination with the quaternary nitrogen atom and another tertiary nitrogen atom, a bicyclic triethylenediamine, $R_4$ and $R_5$ being either identical or different are selected from the group consisting of hydrogen, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms and a group of formula $R_6$—O—$(CH_2)n$ wherein $R_6$ is selected from the group consisting of hydrogen, an alkyl radical having 1 to 12 carbon atoms, a cycloalkyl radical having 4 to 10 carbon atoms, an aralkyl radical having 7 to 10 carbon atoms and an aryl radical having 6 to 10 carbon atoms;

n is an integer having a value from 1 to 6; and $X^-$ is an anion selected from $OH^-$ and anions of formula $^-OOC$—$(O)_a$—$Y$ in which Y is selected from a hydrogen atom, an alkyl group having 1 to 20 carbon atoms, an alkenyl group having 2 to 15 carbon atoms, a cycloalkyl group having 3 to 6 carbon atoms, a phenyl group, an alkylphenyl group having 1 to 9 carbon atoms in the alkyl radical or in the groups attached to the phenyl ring, a benzyl group, an alkylbenzyl group having 1 to 9 carbon atoms in the alkyl radical or in the groups attached to the benzyl ring, and a group $CH_{(3-b)}Z_{(b)}$ in which b is an integer from 1 to 3 and Z is OH, CN, Cl, an alkoxy group of 1 to 5 carbon atoms or a phenyl or methoxyphenyl group, or Z is $(CH_2)_d COOR$ in which d is an integer from 0 to 4 and R is a hydrogen atom or an alkyl group having up to 20 carbon atoms;

and a is zero or 1.

21. The method of claim 18, wherein the quaternary ammonium compound is choline.

22. The method of claim 18, wherein the cocatalyst is of formula I:

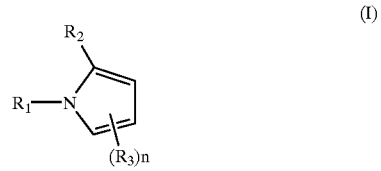

in which $R_1$, $R_2$ and $R_3$ identical or different are selected from the group consisting of H, OH, SH, a $C_1$–$C_4$ alkyl, $C_1$–$C_4$ hydroxyalkyl, $C_1$–$C_4$ aminoalkyl, $C_1$–$C_4$ alkylamino, di($C_1$–$C_4$)alkylamino, $C_1$–$C_4$ alkylthio, $C_1$–$C_4$ haloalkyl, $C_3$–$C_8$ cycloalkyl, $C_5$–$C_{10}$ aryl ($C_5$–$C_4$ aryl)-$C_1$–$C_4$ alkyl, ($C_1$–$C_4$ alkyl)-$C_5$–$C_{10}$ aryl group, a heterocyclic group where the heterocycle has 2 to 10 carbon atoms and 1 to 4 identical or different heteroatoms selected from the group consisting of O, S and N and a group $NR_4$ in which $R_4$ is $C_1$–$C_4$ alkyl or $C_3$–$C_8$ cycloalkyl, and n is 0, 1 or 2.

23. The method of claim 18, wherein the amount of catalyst is from 100 to 300 ppm, relative to the monomeric isocyanate.

24. The method of claim 18, wherein the amount of cocatalyst is from 400 to 800 ppm, relative to the monomeric isocyanate.

25. The method of claim 1, comprising the preparation of isophorone diisocyanate trimer or of a mixed isophorone diisocyanate and hexamethylene diisocyanate trimer in which the proportion of hexamethylene diisocyanate varies from 5 to 95% by weight.

26. The method of claim 1, comprising the preparation of isophorone diisocyanate trimer or of a mixed isophorone diisocyanate and hexamethylene diisocyanate trimer in which the proportion of hexamethylene diisocyanate varies from 5 to 95% by weight.

27. The method of claim 1, comprising the preparation of norbornane diisocyanate trimer or of a mixed norbornane diisocyanate and hexamethylene diisocyanate trimer in which the proportion of hexamethylene diisocyanate varies from 5 to 95% by weight.

28. The method of claim 1, comprising the preparation of 4,4'-dicyclhexylmethanediyl diisocynate trimer or of a mixed 4,4'-dicyclohexylmethanediyl diisocynate and hexamethylene diisocynate trimer in which the portion of hexamethylene diisocynate varies from 5 to 95% by weight.

29. The method of claim 1, comprising the preparation of 4,4'-dicyclohexylmethanediyl diisocyanate trimer or of a mixed 4,4'-dicyclohexylmethanediyl diisocyanate and hexamethylene diisocyanate trimer in which the proportion of hexamethylene diisocyanate varies from 5 to 95% by weight.

30. A composition of (poly)isocyanurate polyisocyanates obtained by the method according to claim 18, wherein the composition is a product of a reaction of a monomeric and/or trimeric isocyanate with imidazole or one of its derivatives, corresponding to the following general formula:

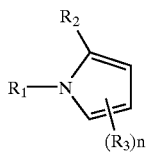

(I)

in which $R_1$, $R_2$ and $R_3$ are identical or different and are selected from the group consisting of H, OH, SH, a $C_1$–$C_4$ alkyl, $C_1$–$C_4$ hydroxylalkyl, $C_1$–$C_4$ aminoalkyl, $C_1$–$C_4$ alkylamino, dialkylamino (each alkyl group having 1 to 4 carbon atoms), $C_1$–$C_4$ alkylthio, $C_1$–$C_4$ haloalkyl, $C_3$–$C_8$ cycloalkyl, $C_5$–$C_{10}$ aryl, ($C_5$–$C_{10}$ aryl)-$C_1$–$C_4$ alkyl or ($C_1$–$C_4$ alkyl)- $C_5$–$C_{10}$ aryl group, a heterocyclic group where the heterocycle has 2 to 10 carbon atoms and 1 to 4 identical or different heteroatoms selected from the group consisting of O, S and N and a group $NR_4$ in which $R_4$ is, in particular, $C_1$–$C_4$ alkyl or $C_3$–$C_8$ cycloalkyl, and n is 0, 1 or 2, as a cocatalyst.

31. A composition of (poly)isocyanurate polyisocyanates obtained by cyclotrimerization of isocyanates, alone or in a mixture, according to the method of claim 1.

32. The method of claim 1, wherein the monomeric isocyanates are at least one of aliphatic isocyanates and cycloaliphatic isocyanates.

33. The method of claim 32, wherein said ionic cation has an average molecular or ionic radius greater than 1.5 Å.

34. The method of claim 32, wherein at least two of the groups $R_1$ to $R_5$ are methyl.

35. The method of claim 32, wherein at least two of the groups $R_1$, $R_2$ and $R_3$ are methyl.

36. The method of claim 32, wherein the compound is choline hydrogencarbonate.

37. The method of claim 32, wherein the amount of catalyst is from 300 to 5000 ppm relative to the monomeric isocyanate or to the mixture of monomeric isocyanates.

38. The method of claim 32, wherein the catalyst is in a solid form obtained by depositing the hydrogen carbonate compound on a solid or by covalent fixing on a support.

39. The method of claim 32, comprising the preparation of isophorone diisocyanate trimer or of a mixed isophorone diisocyanate and hexamethylene diisocyanate trimer in which the proportion of hexamethylene diisocyanate varies from 5 to 95% by weight.

40. The method of claim 32, comprising the preparation of isophorone diisocyanate trimer or of a mixed isophorone diisocyanate and hexamethylene diisocyanate trimer in which the proportion of hexamethylene diisocyanate varies from 5 to 95% by weight.

41. The method of claim 32, comprising the preparation of norbornane diisocyanate trimer or of a mixed norbornane diisocyanate and hexamethylene diisocyanate trimer in which the proportion of hexamethylene diisocyanate varies from 5 to 95% by weight.

42. The method of claim 32, comprising the preparation of 4,4'-dicyclohexylmethanediyl diisocyanate trimer or of a mixed 4,4'-dicyclohexylmethanediyl diisocyanate and hexamethylene diisocyanate trimer in which the proportion of hexamethylene diisocyanate varies from 5 to 95% by weight.

43. The method of claim 32, comprising the preparation of 4,4'-dicyclohexylmethanediyl diisocyanate trimer or of a mixed 4,4'-dicyclohexylmethanediyl diisocyanate and hexamethylene diisocyanate trimer in which the proportion of hexamethylene diisocyanate varies from 5 to 95% by weight.

44. A composition of (poly)isocyanurate polyisocyanates obtained by cyclotrimerization of isocyanates, alone or in a mixture, according to the method of claim 32.

45. The method of claim 3, wherein the monomeric isocyanates are at least one of aliphatic isocyanates and cycloaliphatic isocyanates.

46. The method of claim 45, wherein the cation has the following general formula II:

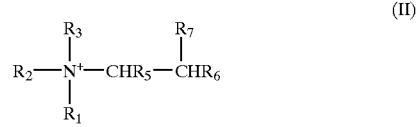

(II)

in which $R_1$, $R_2$ and $R_3$ are identical or different radicals and are selected from the group consisting of unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, and aryl radicals having 6 to 15 carbon atoms which are unsubstituted or substituted by hydroxyl groups, or two of the radicals selected from $R_1$, $R_2$ and $R_3$ form, together with the nitrogen atom and, if appropriate, with an oxygen heteroatom or another nitrogen heteroatom, a heterocyclic ring having 4 to 6 carbon atoms, or the radicals $R_1$, $R_2$ and $R_3$ are each ethylene radicals which form, in combination with the quaternary nitrogen atom and another tertiary nitrogen atom, a bicyclic triethylenediamine skeleton, $R_5$, $R_6$ and $R_7$ are identical or different and are selected from the group consisting of hydrogen, an OH group, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms and a group of formula $R_8$—O—$(CH_2)_n$ in which $R_8$ is hydrogen, an alkyl radical having 1 to 12 carbon atoms, a cycloalkyl radical having 4 to 10 carbon atoms, an aralkyl radical having 7 to 10 carbon atoms and an aryl radical having 6 to 10 carbon atoms;

n is an integer ranging from 1 to 6;

and $R_7$ is optionally a group of formula $OCOR_9$ where $R_9$ is a $C_1$–$C_6$ alkyl group.

47. The method of claim 45, wherein:

$R_1$, $R_2$ and $R_3$ are identical or different and are selected from the group consisting of a linear $C_1$–$C_4$ alkyl group, $R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

48. The method of claim 45, wherein $R_1$, $R_2$ and $R_3$ identical or different represent a $C_1$–$C_3$ group;

$R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and the an acetyl group.

49. The method of claim 45, wherein $R_1$, $R_2$ and $R_3$ identical or different represent a $C_1$–$C_2$ group;

$R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

50. The method of claim 45, wherein $R_1$, $R_2$ and $R_3$ identical or different represent a methyl group $R_5$ is selected from the group consisting of H, OH, a methyl group and a hydroxymethyl group, $R_6$ is selected from the group consisting of H, OH, a methyl group and a hydroxymethyl group, $R_7$ is selected from the group consisting of H, OH, a methyl group, a hydroxymethyl group and an acetyl group.

51. The method of claim 45, wherein:

$R_1$, $R_2$ and $R_3$ identical or different represent a $C_1$–$C_4$ alkyl group, $R_5$ is H or a $C_1$–$C_4$ alkyl group, $R_6$ is H, OH or a $C_1$–$C_4$ alkyl group, $R_7$ is H, OH, a $C_1$–$C_4$ alkyl group or an acetyl group where the total number of carbon atoms of $R_1$ to $R_7$ does not exceed 8.

52. The method of claim 45, wherein at least one of groups $R_1$ to $R_3$ is a methyl group.

53. The method of claim 45, wherein at least one of groups $R_1$ to $R_3$ is a methyl group, and one of $R_5$ to $R_7$ is OH.

54. The method of claim 45, wherein $R_1$ to $R_3$ are a $C_1$–$C_4$ alkyl group or a $C_1$–$C_4$ hydroxyalkyl group and $R_5$ to $R_7$ are H or OH.

55. The method of claim 18, wherein the monomeric isocyanates are at least one of aliphatic isocyanates and cycloaliphatic isocyanates.

56. The method of claim 55, wherein the cyclotrimerization catalyst is a hydrogencarbonate of a cation which either as such or in the form complexed with a complexing agent has an average molecular or ionic radius of more than 1 Å.

57. The method of claim 55, wherein the catalyst is a the quaternary ammonium salt of general formula:

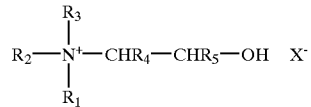

in which $R_1$, $R_2$ and $R_3$ identical or different are selected from the group consisting of unsubstituted or hydroxylated alkyl groups having 1 to 20 carbon atoms, cycloalkyl radicals having 4 to 15 carbon atoms which are unsubstituted or substituted by hydroxyl groups, aralkyl radicals having 7 to 15 carbon atoms which are unsubstituted or substituted by hydroxyl groups, and aryl radicals having 6 to 15 carbon atoms which are unsubstituted or substituted by hydroxyl groups, or two of the radicals $R_1$, $R_2$ or $R_3$ optionally form together with the nitrogen atom and, if appropriate, with an oxygen heteroatom or another nitrogen heteroatom, a heterocyclic ring having 4 to 6 carbon atoms, or the radicals $R_1$, $R_2$ and $R_3$ are each ethylene radicals which form, in combination with the quaternary nitrogen atom and another tertiary nitrogen atom, a bicyclic triethylenediamine skeleton, $R_4$ and $R_5$ identical or different are selected from the group consisting of hydrogen, an alkyl group having 1 to 12 carbon atoms, a cycloalkyl group having 5 to 7 carbon atoms, an alkenyl group having 2 to 15 carbon atoms, an alkynyl group having 3 to 6 carbon atoms, a hydroxyalkyl group having 1 to 9 carbon atoms, an aralkyl group having 7 to 10 carbon atoms, an aryl group having 6 to 10 carbon atoms and a group of formula $R_6$—O—$(CH_2)_n$ wherein $R_6$ is selected from the group consisting of hydrogen, an alkyl radical having 1 to 12 carbon atoms, a cycloalkyl radical having 4 to 10 carbon atoms, an aralkyl radical having 7 to 10 carbon atoms and an aryl radical having 6 to 10 carbon atoms;

n is an integer having a value from 1 to 6; and $X^-$ is an anion selected from $OH^-$ and anions of formula $^-OOC$—$(O)_a$—Y in which Y is selected from a hydrogen atom, an alkyl group having 1 to 20 carbon atoms, an alkenyl group having 2 to 15 carbon atoms, a cycloalkyl group having 3 to 6 carbon atoms, a phenyl group, an alkylphenyl group having 1 to 9 carbon atoms in the alkyl radical or in the groups attached to the phenyl ring, a benzyl group, an alkylbenzyl group having 1 to 9 carbon atoms in the alkyl radical or in the groups attached to the benzyl ring, and a group $CH_{(3-b)}Z_{(b)}$ in which b is an integer from 1 to 3 and Z is OH, CN, Cl, an alkoxy group of 1 to 5 carbon atoms or a phenyl or methoxyphenyl group, or Z is $(CH_2)_d COOR$ in which d is an integer from 0 to 4 and R is a hydrogen atom or an alkyl group having up to 20 carbon atoms;

and a is zero or 1.

58. The method of claim 55, wherein the quaternary ammonium compound is choline.

59. The method of claim 55, wherein the cocatalyst is of general formula I:

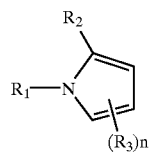

in which $R_1$, $R_2$ and $R_3$ identical or different are selected from the group consisting of H, OH, SH, a $C_1$–$C_4$ alkyl, $C_1$–$C_4$ hydroxyalkyl, $C_1$–$C_4$ aminoalkyl, $C_1$–$C_4$ alkylamino, di($C_1$–$C_4$)alkylamino, $C_1$–$C_4$ alkylthio, $C_1$–$C_4$ haloalkyl, $C_3$–$C_8$ cycloalkyl, $C_5$–$C_{10}$ aryl, ($C_5$–$C_4$ aryl)-$C_1$–$C_4$ a ($C_1$–$C_4$ alkyl)-$C_5$–$C_{10}$ aryl group, a heterocyclic group where the heterocycle has 2 to 10 carbon atoms and 1 to 4 identical or different heteroatoms selected from the group consisting of O, S and N and a $NR_4$ in which $R_4$ is $C_1$–$C_4$ alkyl or $C_3$–$C_8$ cycloalkyl, and n is 0, 1 or 2.

60. The method of claim 58, wherein the amount of catalyst is from 100 to 300 ppm, relative to the monomeric isocyanate.

61. The method of claim 58, wherein the amount of cocatalyst is from 400 to 800 ppm, relative to the monomeric isocyanate.

62. A composition of (poly)isocyanurate polyisocyanates obtained by the method according to claim 55, comprising the product of reaction of the monomeric and/or trimeric isocyanate with imidazole or one of its derivatives.

63. The method of claim 3, wherein said cation of formula I has a single OH group in the omega position relative to the central nitrogen atom.

64. The method of claim 45, wherein said cation of formula I has a single OH group in the omega position relative to the central nitrogen atom.

* * * * *